United States Patent
Gorelick

(10) Patent No.: US 12,389,093 B2
(45) Date of Patent: Aug. 12, 2025

(54) CROSS-PARTITION CAMERA SYSTEM

(71) Applicant: QUOYI INNOVATIVE PRODUCTS, INC., Austin, TX (US)

(72) Inventor: Richard B. Gorelick, Austin, TX (US)

(73) Assignee: QUOYI INNOVATIVE PRODUCTS, INC., Austin, TX (US)

( * ) Notice: Subject to any disclaimer, the term of this patent is extended or adjusted under 35 U.S.C. 154(b) by 177 days.

(21) Appl. No.: 18/211,395

(22) Filed: Jun. 19, 2023

(65) Prior Publication Data

US 2023/0421871 A1    Dec. 28, 2023

Related U.S. Application Data

(60) Provisional application No. 63/355,367, filed on Jun. 24, 2022.

(51) Int. Cl.
   *H04N 23/50* (2023.01)
   *H04N 23/51* (2023.01)
   *H04N 23/55* (2023.01)

(52) U.S. Cl.
   CPC .................................. *H04N 23/50* (2023.01)

(58) Field of Classification Search
   CPC ......... H04N 23/50; H04N 23/51; H04N 23/55
   See application file for complete search history.

(56) References Cited

U.S. PATENT DOCUMENTS

| | | | |
|---|---|---|---|
| 6,731,439 B1 | 5/2004 | Peachee | |
| 6,888,940 B1* | 5/2005 | Deppen | B60R 11/0241 379/454 |
| 8,749,899 B1* | 6/2014 | Peachee | G02B 25/008 359/813 |
| 2005/0168578 A1* | 8/2005 | Gobush | A63B 69/3614 348/207.99 |
| 2014/0350395 A1* | 11/2014 | Shachaf | G06T 7/0012 600/431 |
| 2018/0324288 A1* | 11/2018 | Rothbaum | H04B 1/3888 |
| 2021/0030263 A1* | 2/2021 | Kikuchi | A61B 1/043 |

* cited by examiner

*Primary Examiner* — Ahmed A Berhan
(74) *Attorney, Agent, or Firm* — Andrew F. Young, Esq.; Nolte Lackenbach Siegel

(57) ABSTRACT

A cross-partition camera includes a magnetic camera and a magnetic backer ring coupled across a partition. The cross-partition camera provides additional functionality to be selectively coupled across a stand, a transparent glass pane, or other partition media. The cross-partition camera also includes magnet holders laterally offset from a frustoconical ring reducing the size. The magnet backer ring is optionally buoyant in water to minimize loss. A scrubber pad on a partition-facing side of the magnetic backer ring cleans the interior surface of the partition. An optional felt pad on the partition-facing side of the magnetic camera facilitates smooth movement of the device on the partition. An light filter is provided to improve video and image quality. The cross-partition camera also includes a USB port for optional internal power supply, image connectivity, a speaker, microphone, and onboard secure data storage through an SD access port for storing images.

18 Claims, 10 Drawing Sheets

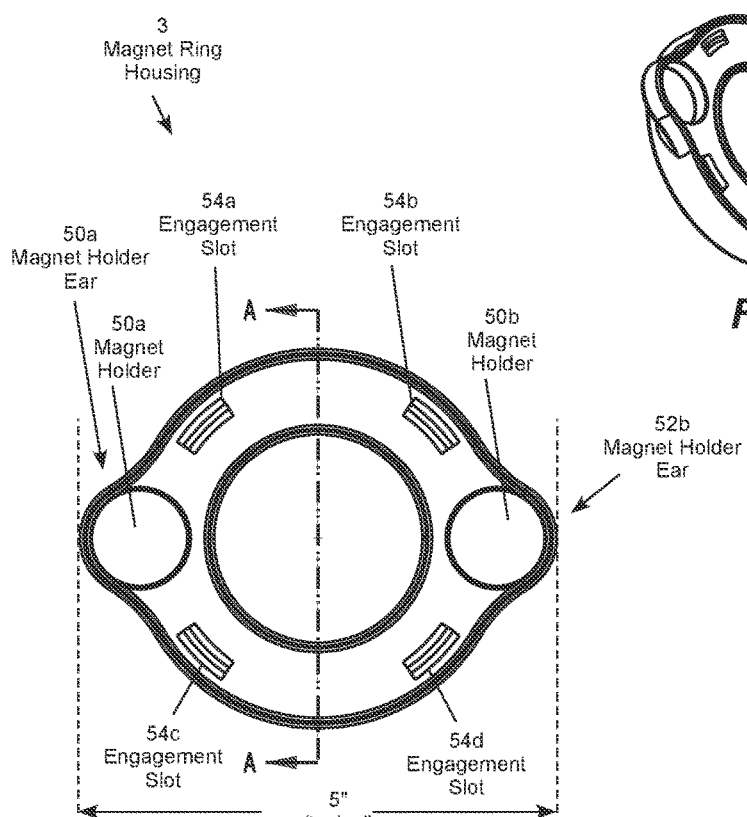
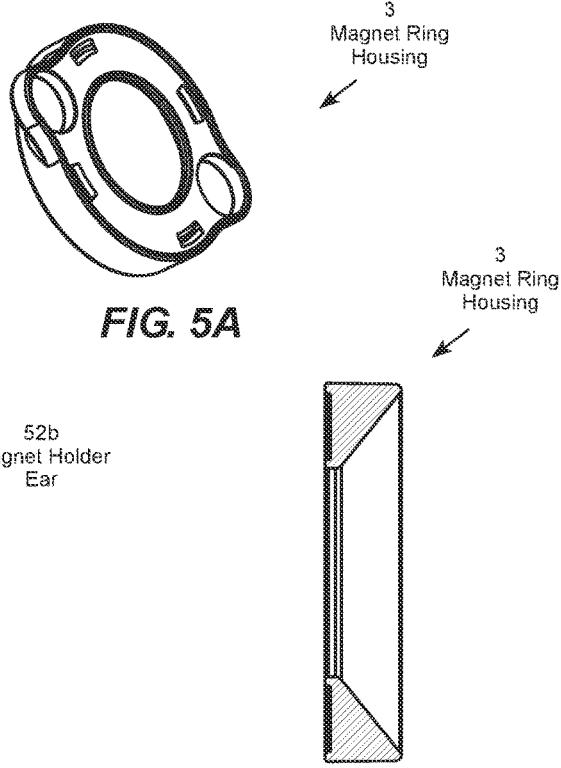
FIG. 5A
FIG. 5B
FIG. 5C
SECTION A-A

SECTION A-A

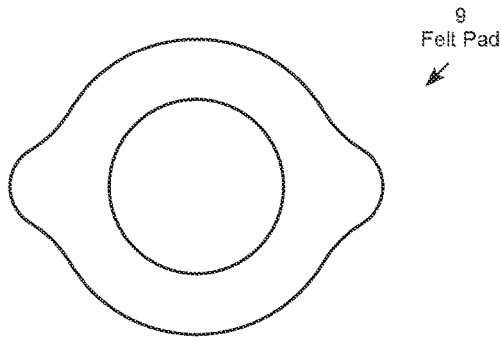
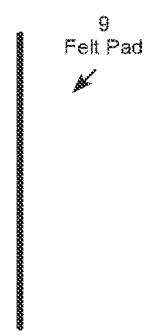
FIG. 10A
FIG. 10B
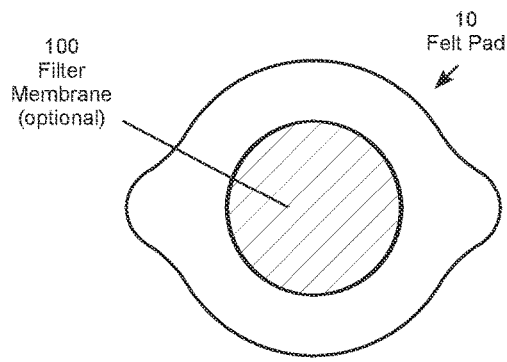
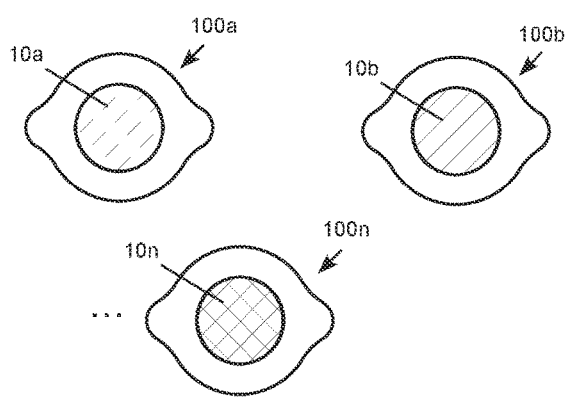
FIG. 10C
FIG. 10D

CROSS-PARTITION CAMERA SYSTEM

CROSS REFERENCE TO RELATED APPLICATIONS

This application claims filing priority to U.S. Provisional patent application Ser. No. 06/242,022 filed Jun. 24, 2022, which is incorporated fully by reference.

FIGURE FOR PUBLICATION

FIG. 1

BACKGROUND OF THE INVENTION

Field of the Invention

The present invention is directed to optical camera systems and, more particularly, to a cross-partition camera with a magnetic camera coupled to a magnetic backer ring positioned on opposing sides of a partition, such as a stand or a glass pane of a fish tank.

Description of the Related Art

Taking pictures or video across a partition, such as a glass pane of a fish tank, can be challenging due to reflection at the partition surface, contamination on the glass, ambient color of the water, colored lighting, and other factors. The image quality can be improved by holding the camera perpendicular and close to the partition, and also by cleaning the partition surface. U.S. Pat. Nos. 6,731,439 and 8,749,899 describe cross-partition lens assemblies with magnetically coupled interior and exterior housings enabling movement of the exterior housing to control movement of the interior housing.

However, conventional systems are too large, bulky and expensive to be suitable for more modest settings, such as home fish tanks. A continuing need therefore exists for improved and more cost effective cross-partition cameras.

ASPECTS AND SUMMARY OF THE INVENTION

At least one of the aspects of the present invention is to provide an improvement over the related art.

Another aspect of the present invention is to provide an improvement wherein the needs described above are met in a cross-partition camera that includes a magnetic camera and a magnetic backer ring coupled across a partition. Unlike conventional fish tank cameras, the cross-partition camera provides additional functionality allowing it to be selectively suspended form different types of partitions, such as a stand, glass pane, or fish tank wall. The cross-partition camera also includes magnet holder ears laterally offset from a frustoconical ring reducing the size and cost of the housings. Additional features include a buoyant backer ring, a scrubber pad on the partition-facing side of the magnetic backer ring to clean the interior surface of the partition (e.g., fish tank), and a felt pad on the partition-facing side of the magnetic camera to facilitate smooth movement of the device on the partition. The cross-partition camera also includes a USB port for connectivity, a light sensor, LED lighting, supplemental LED lighting for low-light photography, a speaker, speaker access, microphone, microphone access, and onboard SD data card. The cross-partition camera may optionally include optical filters, such as colored optical filters to enhance contract and diminish certain unwanted colors, such as the colors of the fish take water or fish tank lighting, while enhancing other desired colors, such as the colors of fish and other photography subjects inside the fish tank. The cross-partition camera may optionally include wireless communication functionality such as Wi-Fi connectivity to a local network or optionally cellular operation features for linking and placing cellular indicators or receiving cellular commands.

According to an optional and adaptive embodiment of the present invention, there is provided a cross-partition camera system, comprising, a magnetic camera; a magnetic backer ring operative to couple with the magnetic camera to remain movably suspended across a partition; wherein the magnetic camera and the magnetic backer ring define magnet holder ears housing magnets laterally offset from a frustoconical ring of the backer ring; and wherein the magnetic backer ring is buoyant in water when uncoupled from the magnetic camera.

According to another optional and adaptive embodiment of the present invention, there is provided a cross-partition camera system, wherein, the magnetic camera further comprises a USB port and a removable SD memory card.

According to another optional and adaptive embodiment of the present invention, there is provided a cross-partition camera system, further comprising, a scrubber pad positioned on a partition-facing side of the magnetic backer ring.

According to another optional and adaptive embodiment of the present invention, there is provided a cross-partition camera system, wherein, the scrubber pad is operative for cleaning a portion of a side of the partition as the magnetic camera is manually moved around on the partition while remaining magnetically coupled to the partition.

According to another optional and adaptive embodiment of the present invention, there is provided a cross-partition camera system, further comprising, a felt pad on a partition-facing side of the magnetic camera.

According to another optional and adaptive embodiment of the present invention, there is provided a cross-partition camera system, wherein, the felt pad is operative for facilitating smooth movement of the magnetic camera as the magnetic camera is manually moved around on the partition while remaining magnetically coupled to the partition.

According to another optional and adaptive embodiment of the present invention, there is provided a cross-partition camera system, further comprising, an optical filter positioned across a lens of the magnetic camera.

According to another optional and adaptive embodiment of the present invention, there is provided a cross-partition camera system, wherein, the optical filter is orange colored to filter out blue light.

According to another optional and adaptive embodiment of the present invention, there is provided a cross-partition camera system, wherein, the optical filter is removable.

According to another optional and adaptive embodiment of the present invention, there is provided a cross-partition camera system, further comprising, a plurality of selectable removable optical filters shaped for positioning across a lens of the magnetic camera.

According to another optional and adaptive embodiment of the present invention, there is provided a cross-partition camera system, wherein, the plurality of selectable removable optical filters comprises a plurality of orange colored filter of different color depth to filter different amounts of blue light.

According to another optional and adaptive embodiment of the present invention, there is provided a cross-partition camera system, further comprising, a light source for projecting light away from the magnetic camera toward a focal region of the magnetic camera.

According to another optional and adaptive embodiment of the present invention, there is provided a cross-partition camera system, wherein, the partition further comprises, a removable stand and the cross-partition camera system is configured for magnetic coupling across a glass pane after removal from the stand.

According to another optional and adaptive embodiment of the present invention, there is provided a cross-partition camera system, wherein, the partition comprises a glass pane.

According to another optional and adaptive embodiment of the present invention, there is provided a cross-partition camera system, comprising, a magnetic camera; a magnetic backer ring operative to couple with the magnetic camera to remain movably suspended across a partition; wherein the magnetic camera and the magnetic backer ring define magnet holder ears housing magnets laterally offset from a frustoconical ring of the backer ring; wherein the magnetic backer ring is buoyant in water when uncoupled from the magnetic camera. further comprising, a scrubber pad on a partition-facing side of the magnetic backer ring operative for cleaning the partition opposite the partition-facing side of the magnetic backer ring as the cross-partition camera system is manually moved around on the partition while remaining magnetically coupled to the partition; and further comprising, a felt pad on a partition-facing side of the magnetic camera operative for facilitating facilitate smooth movement of the device on the cross-partition camera as the cross-partition camera system is manually moved around on the partition while remaining magnetically coupled to the partition.

According to another optional and adaptive embodiment of the present invention, there is provided a cross-partition camera system, further comprising, a plurality of selectable removable optical filters shaped for positioning across a lens of the magnetic camera.

According to another optional and adaptive embodiment of the present invention, there is provided a cross-partition camera system, wherein, the partition comprises a removable stand.

According to another optional and adaptive embodiment of the present invention, there is provided a cross-partition camera system, comprising, a magnetic camera; a magnetic backer ring operative to couple with the magnetic camera to remain movably suspended across a partition; wherein the magnetic camera and the magnetic backer ring define magnet holder ears housing magnets laterally offset from a frustoconical ring of the backer ring; wherein the magnetic backer ring is buoyant in water when uncoupled from the magnetic camera; and further comprising, an optical filter positioned across a lens of the magnetic camera.

According to another optional and adaptive embodiment of the present invention, there is provided a cross-partition camera system, wherein, the optical filter is orange colored to filter out blue light.

According to another optional and adaptive embodiment of the present invention, there is provided a cross-partition camera system, wherein, the optical filter is one of a plurality of selectable optical filters of different color depth to filter out different amounts of blue light.

It will be understood that specific embodiments may include a variety of features in different combinations, and that all of the features described in this disclosure, or any particular set of features, needs to be included in particular embodiments. The specific techniques and structures for implementing particular embodiments of the invention and accomplishing the associated advantages will become apparent from the following detailed description of the embodiments and the appended drawings and claims.

BRIEF DESCRIPTION OF THE FIGURES

The numerous advantages of the embodiments of the invention may be better understood with reference to the representative embodiments shown in the accompanying figures.

FIGS. 5A-5C show a magnetic ring housing of the cross-partition camera system.

FIGS. 10A-10D show a felt pad of the cross-partition camera and associated optical filters system.

DETAILED DESCRIPTION OF EMBODIMENTS

Figure 1:
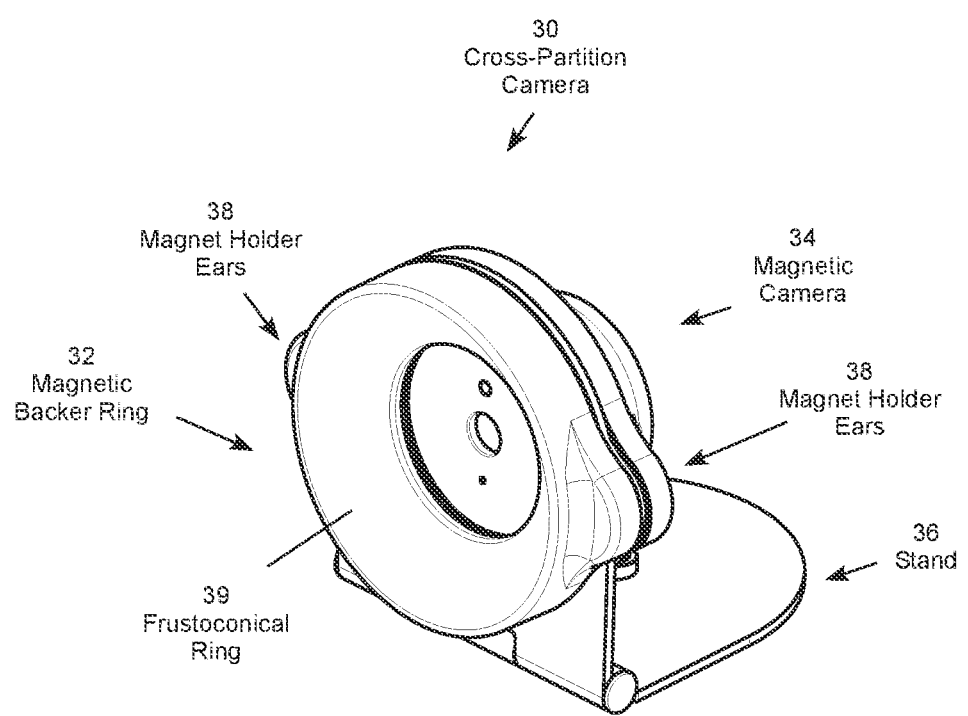
FIG. 1 is a perspective view of a cross-partition camera system in a stand arrangement.

Reference will now be made to illustrative embodiments of the invention shown in the drawings. In general, the same or similar reference numerals are used in the drawings and the description to refer to the same or like parts or steps. The drawings are in simplified form and are not to precise scale. The word "couple" and similar terms do not necessarily denote direct and immediate connections, but also include connections through intermediate elements or devices. For purposes of descriptive convenience and clarity, directional (upper/lower, left/right, inner/outer, etc.) or motional (up/down, forward/back, etc.) terms may be used to describe to the drawings. These and similar relative terms should not be construed to limit the scope of the claimed invention. Elements may be positioned differently than shown in the drawings or stated in written description with reference to the illustrative embodiments. It will therefore be understood that other embodiments may be utilized within the scope of the claimed invention.

FIG. 1 is a perspective view of a cross-partition camera 30 assembly or system, which includes a magnetic backer ring 32 assembly or system and a magnetic camera assembly 34 (magnetic camera 34) magnetically coupled to each other across a partition, in this example a magnetically transmissive stand 36. The strength of the magnetic coupling allows the backer ring and retained camera to be readily moved around on the partition by hand, with movement of the camera causing the backer ring to remain coupled, resist unintended separation and follow as a result of the magnetic coupling. The retained camera 34 and backer ring 32 can also be easily removed by hand from the partition so they can be relocated and placed across another partition, such as a glass pane of a fish tank or any other suitable location such as a front door, vehicle window, outside window, or other location suitable for camera mounting. The magnetic backer ring 32 and magnetic camera 34 include respectively one or more magnet holder ears 38, which are, in this embodiment, shown laterally offset from a frustoconical ring 39 or the magnetic camera 34 (See FIG. 4) projecting outwardly and thereby reducing the size and cost of the housings. The backer ring 32 is buoyant in water so that it floats to the surface in the event that it becomes separated from the magnetic camera 34 under water, for example on the inside of a fish tank.

It will be understood that the buoyancy of backer ring 32 may be provided by alternative and adaptive mechanisms, such that a foam filling (buoyant) in closed or open celled foam or air bladders or air cells (both not shown) may be used to prevent backer ring 32 sinking should there be unintentional magnetic separation from camera 34.

It will be understood that the present frustoconical ring may be of any suitable shape or size to accomplish the required steps, and particular so that such a surrounding retaining ring have an opening to allow the cameras electronic image sensor and lens (and optional flash or lighting) arrangement, or for enabling multiple camera mountings on an outside of partition 34 and to function without departing from the scope and spirit of the present invention.

Figure 2:
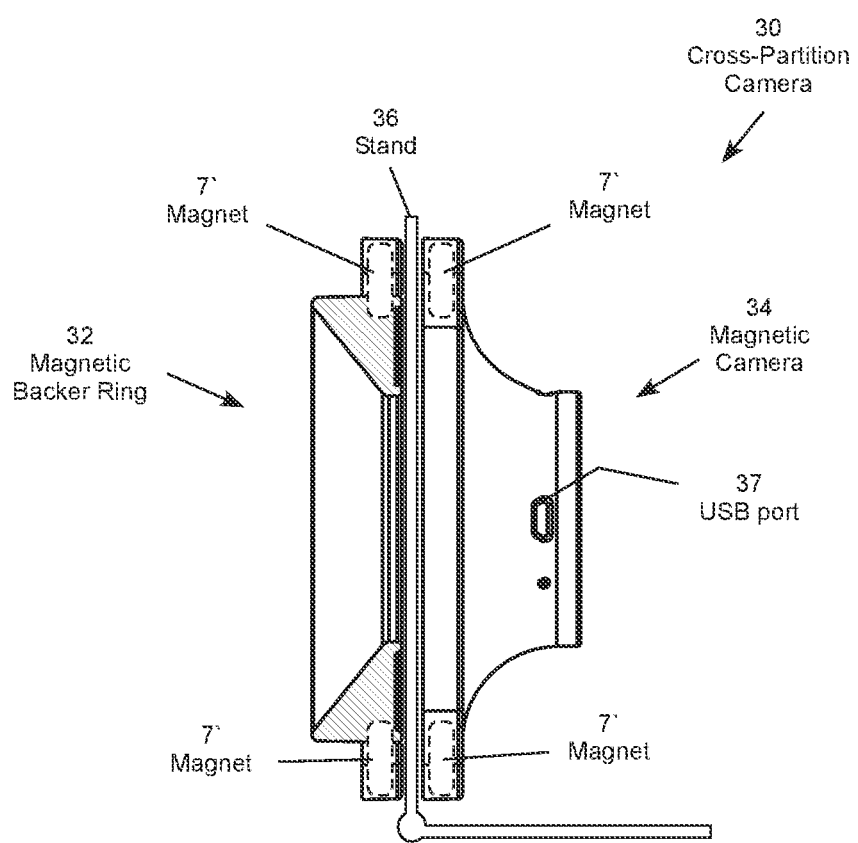
FIG. 2 is a side view of the cross-partition camera system coupled across a stand arrangement as in FIG. 1.
Figure 3:
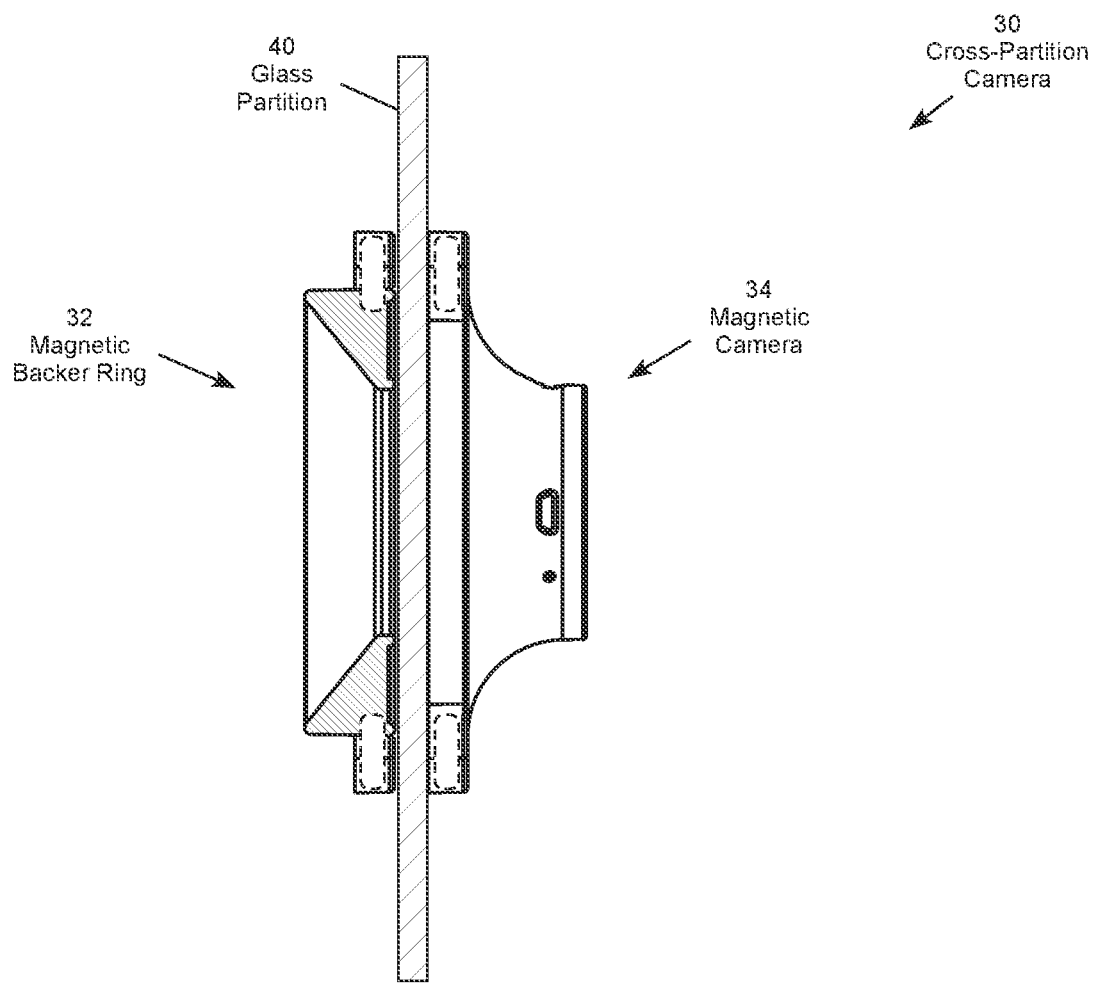
FIG. 3 is a side view of the cross-partition camera system coupled across a glass partition.

The lightweight construction of the cross-partition camera 30 allows it to be readily moved by hand from one partition to another. For example, FIG. 2 is a side view of the cross-partition camera 30 showing the magnetic backer ring 32 and magnetic camera 34 coupled across the stand 36, while FIG. 3 shows the backer ring and camera coupled across a glass partition 40, such as a glass pane of a fish tank. The magnetic backer ring 32 and magnetic camera 34 each house a pair of magnets 7 opposing each other to magnetically couple the backer ring with the camera across the partition. The camera 34 also includes a USB port 37 visible in these views.

Figure 4:
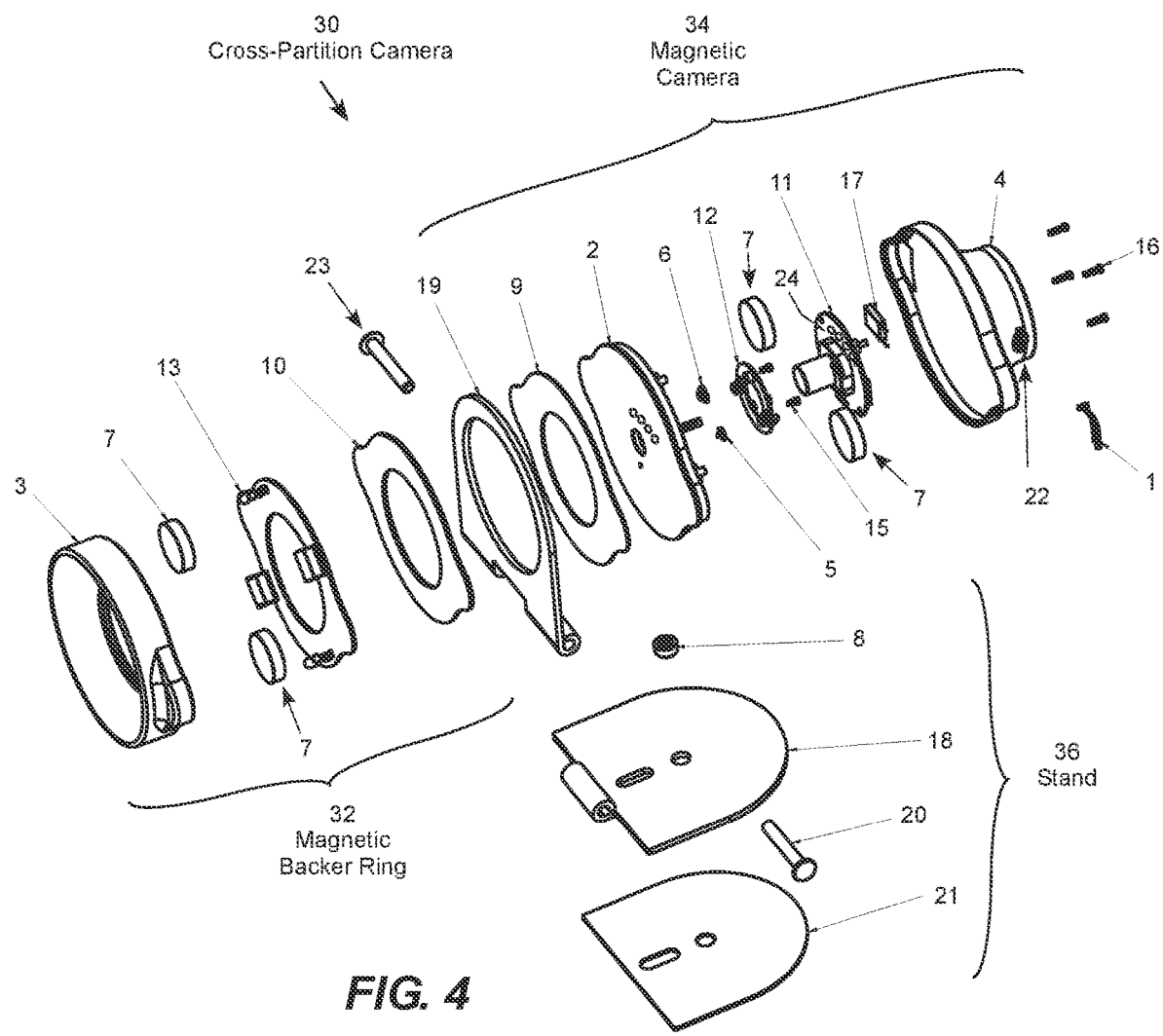
FIG. 4 is an exploded view of the cross-partition camera system with an exemplary stand arrangement.

FIG. 4 is an exploded view of the cross-partition camera 30 (alternatively as shown in FIGS. 1-2, and FIG. 3 (where there is a glass partition). The magnetic backer ring 32 includes a magnet ring housing 3 ("housing, ring, housing") shown in greater detail in FIGS. 5A-5D, a pair of magnets 7, 7, a magnet retainer plate 13 ("plate, retainer, magnet") shown in greater detail FIGS. 6A-6D, and a scrubber pad 10 ("pad, Velcro®, hook", or 'spacer') shown in greater detail FIGS. 7A-7B and FIGS. 10A-10D where the scrubber pad may additionally mount a filter (as will be discussed later). The various molded housings, plates and other formed components may be fabricated from any suitable plastic, such as polystyrene or acrylonitrile butadiene styrene (ABS). Selected designated components of the cross-partition camera 30 are listed in Table 1 and referenced additionally in FIG. 4.

TABLE 1

| Item | Description | QTY |
|---|---|---|
| 1 | COVER for SD port (scan disk(SD) access cover) | 1 |
| 2 | HOUSING, FRONT | 1 |
| 3 | HOUSING, MAGNET, RING | 1 |
| 4 | HOUSING, MAIN | 1 |
| 5 | LENS, LED | 1 |
| 6 | LENS, SENSOR | 1 |
| 7 | MAGNET, optionally of a magnetic type known as D43-N53 | 4 |
| 8 | NUT, PEM 1/4-20 - 056 - STAINLESS STEEL | 1 |
| 9 | PAD, FELT | 1 |

TABLE 1-continued

| Item | Description | QTY |
|---|---|---|
| 10 | PAD, VELCRO, HOOK (SCRUBBER) | 1 |
| 11 | PCB, CAMERA (one or more co-mounted on PCB) | 1 |
| 12 | PCB, SENSOR | 1 |
| 13 | PLATE, RETAINER, MAGNET | 1 |
| 30 | (noted also as CROSS-PARTITION CAMERA 30) | 1 |
| 15 | SCREW | 2 |
| 16 | SCREW | 4 |
| 17 | SPEAKER AND MICROPHONE | 1 |
| 18 | STAND, BASE | 1 |
| 19 | STAND, FACEPLATE | 1 |
| 20 | STAND, PIVOT, PIN | 2 |
| 21 | STAND, RUBBER, FOOT | 1 |
| 22 | SD PORT | 1 |
| 23 | HINGE PIN | 1 |
| 24 | SUPPLEMENTAL LIGHT SOURCE LED | 4 |
| 37 | USB PORT | 1 |

Figure 9A:
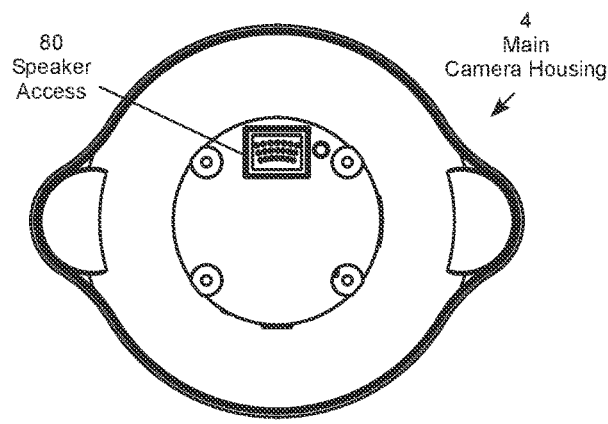
FIGS. 9A-9D show a main camera housing of the cross-partition camera system.
Figure 9B:
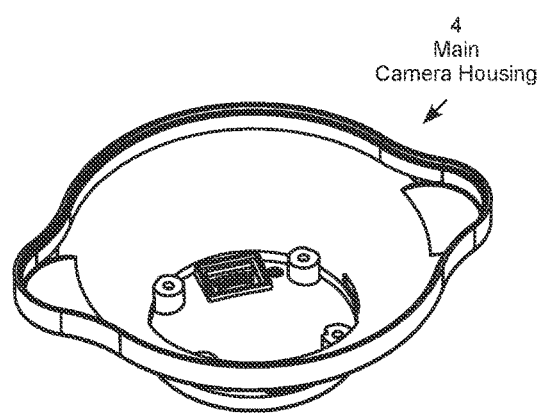
Figure 9C:
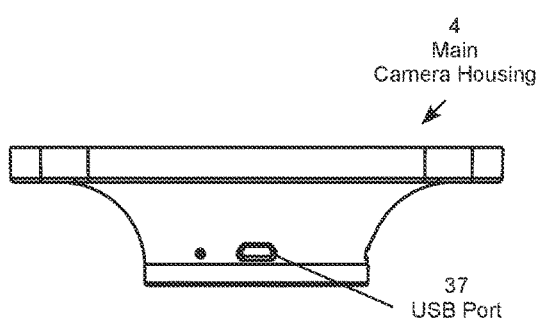
Figure 9D:
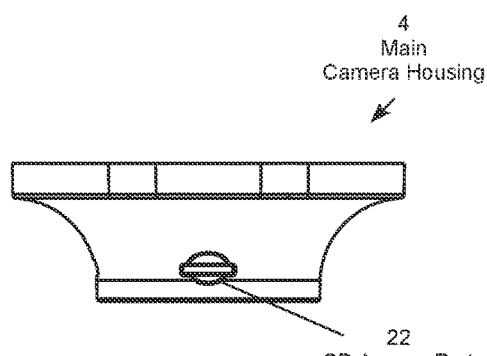

The cross-partition camera 30 also includes a USB port 37 for connectivity, a light sensor 6, LED lighting 5, supplemental LED lighting 24 for low-light photography, a speaker and microphone 17, and rearwardly positioned a speaker access 80 port (see FIG. 9A, 9B) for sound release from the housing, and an onboard SD (Scan Disk) port 22 for receiving an SD (Scan Disk) data card for storing photo or video data files. The cross-partition camera 30 (cross-partition camera assembly, or unit, or kit) may optionally include light-optical filters 100, 100a, 100b . . . -100n (alternative multiple light filter membranes) shown in FIGS. 10-A-10D, which may be sold and packaged separately in one or more light filter-membrane kits (not shown), and may be filters such as colored optical filters (photo/video filters) to enhance contract and diminish certain unwanted colors, such as the colors of the fish take water or fish tank lighting or their interaction or use of IR or other desired wavelength spectrums, while enhancing other desired colors, such as the colors of fish and other photography subjects inside the fish tank. The camera 11 utilizes a light sensor 6 to determine the ambient light level for controlling the light source (LED) 5 projecting light toward a focal region of the magnetic camera. Supplemental light sources (LEDs) 23 man be included to provide additional light projection, for example to aid in low-light and high-speed photography, toward a focal region of the magnetic camera. The felt pad 9 facilitates smooth movement of the cross-partition camera 30 on one side of the partition, while the scrubber 10 (also in the form of a felt pad or other scrubber form) cleans a portion of the opposite side of the partition, when the camera is manually moved around while remaining magnetically coupled to the partition. It will be understood that the optical filters 100 may be positioned in one or both of scrubber 10 or felt pad 9 (or both) depending upon the adaptive embodiment considered and such optionality is within the scope of the present disclosure.

Referring to FIGS. 5A-5C, the magnet ring housing 3 includes a pair of magnet holders 50a-50b extending laterally into respective magnet holder ears 52a-52b. The magnet ring housing 3 four engagement slots 54a-54d for receiving engagement members 60a-60d (see FIGS. 6A-6C). The magnetic backer ring 32 is buoyant allowing it to float if it becomes uncoupled from the magnetic camera while under water, for example inside a fish tank. Buoyancy may be achieved in several ways, such as fabricating the magnet ring housing 3 by over-molding a plastic cover layer over a closed-cell core, such as expanded polyethylene foam or any other suitable closed-cell material. Alternatively, the magnet ring housing 3 may be fabricated entirely from a closed-cell material, or include a closed-cell portion, such as the frustoconical section, attached to a molded plastic base plate. As another alternative, the magnet ring housing 3 may enclose one or more sealed air chambers.

Figure 6A:
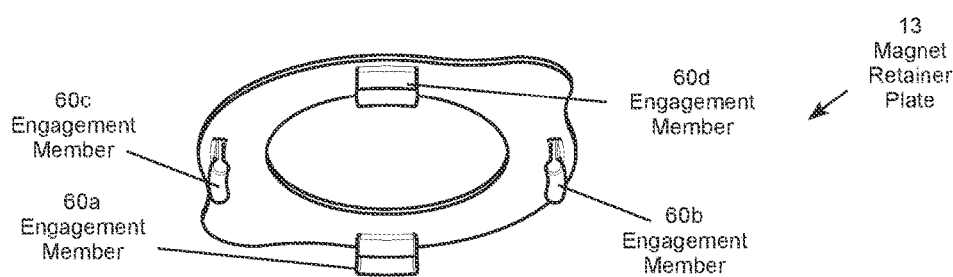
FIGS. 6A-6C show a front housing plate of the cross-partition camera system.
Figure 6B:
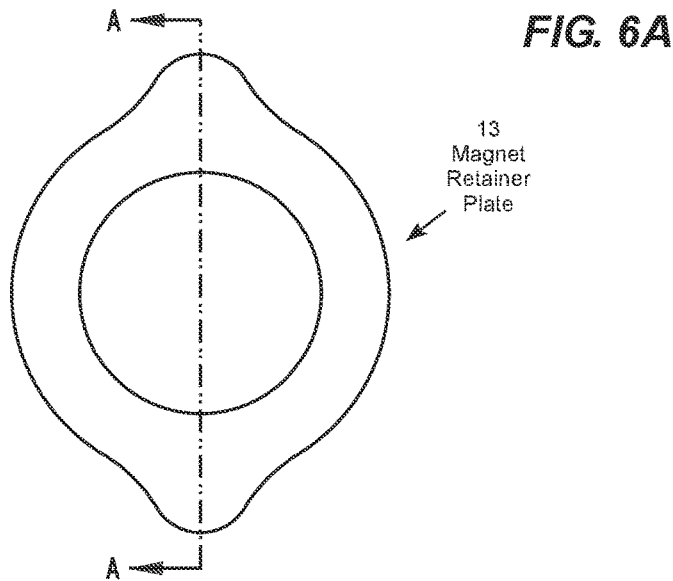
Figure 6C:
Figure 7A:
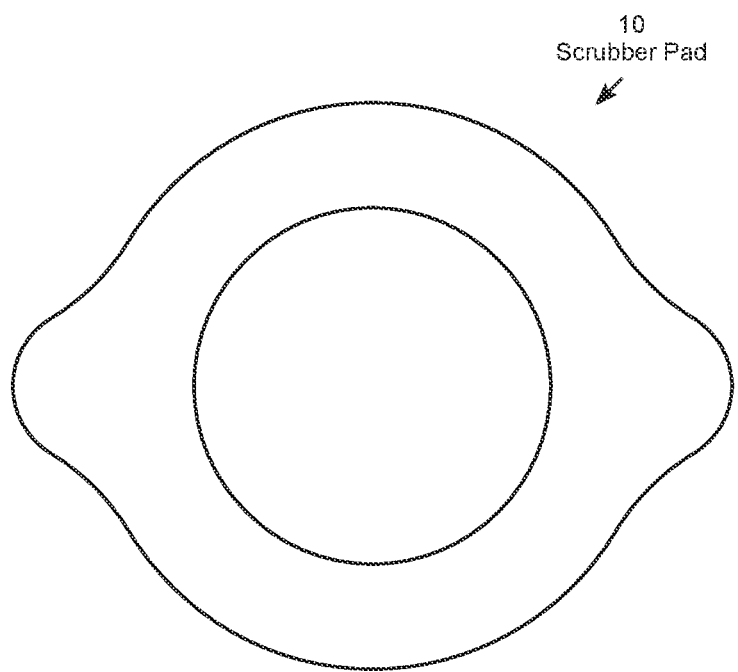
FIGS. 7A-7B show a scrubber pad of the cross-partition camera system.
Figure 7B:
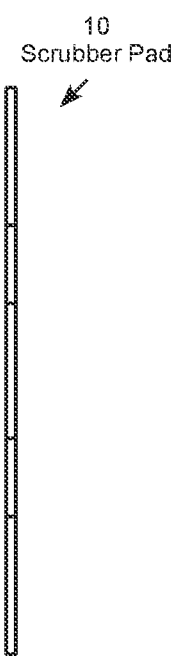
Figure 8A:
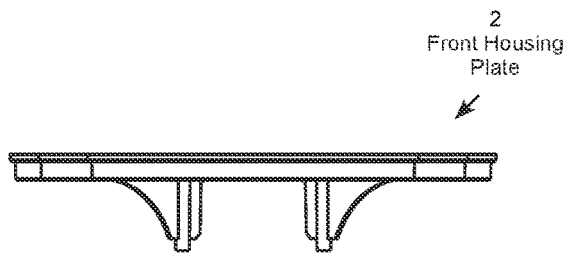
FIGS. 8A-8D show a front housing plate of the cross-partition camera system.
Figure 8B:
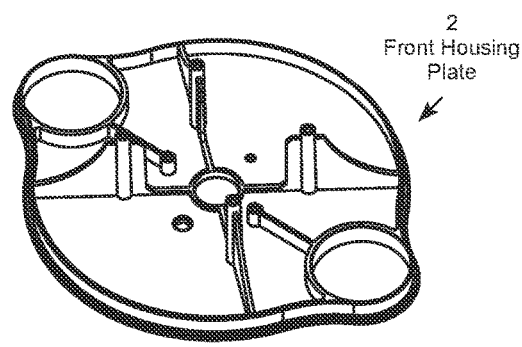
Figure 8C:
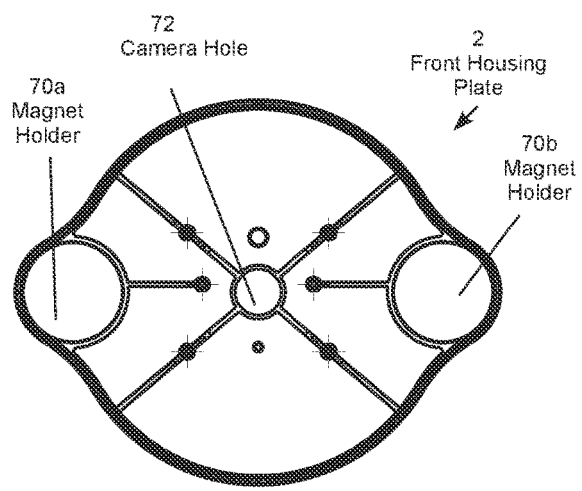
Figure 8D:
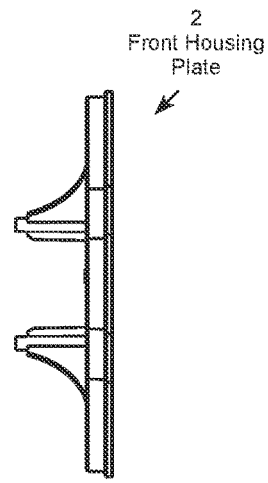

Referring to FIGS. 6A-6C, the magnet retainer plate 13 includes four engagement members 60a-60d that engage with respective engagement slots 54a-54d of magnet ring housing 3 (see FIGS. 5A-5C) capturing the batteries 7 between the magnet ring housing 3 and the magnet retainer plate. Referring to FIGS. 7A-7B, the scrubber pad 10 is adhered to the partition-facing side of the magnet retainer plate 13. This allows the user to move magnetic camera 34 around on the partition the clean the opposing side of the partition, for example on the inside of a fish tank. The hook portion of a hook-and-loop fastener (Velcro) works well for this purpose.

Referring again to FIG. 4, the stand 39 includes a stand base 18, a faceplate 19, a rubber foot 21, and a pivot pin 20, 23 with nut 8. The magnetic camera 34 includes the remaining elements identified on FIG. 4 including, among others, the front housing plate 2 ("housing, front" in the legend on FIG. 4) shown in greater detail on FIGS. 8A-8D, the main camera housing 4 ("housing, main" in the legend on FIG. 4) shown in greater detail on FIGS. 9A-9D, and the felt pad 9 ("pad, felt" in the legend on FIG. 4) shown in greater detail on FIGS. 10A-10B. FIG. 10C shows an alternative felt pad 10 including an optional colored filter membrane 100 at the center of the pad. FIG. 10D illustrates multiple selectable felt pads 10a-10n, each with a different respective optical filter 100a-100n allowing the user to remove and replace the filter. This allows different filters to be selected to diminish different colors of light. In general, a colored optical filter diminishes its opposite color on the color wheel. For example, an orange colored will block diminish blue light, a red filter will diminish cyan light, a magenta will diminish green light, and so forth. For underwater photography, such as fish tank photography, diminishing blue lite is often desired to improve the contrast for images taken in water illuminated by blue lights, and a magenta filter may be selected to improve the contrast for images taken in water illuminated by green lights. For this purpose, the optical filters 100a . . . -100n may include orange filters with different depths of orange tint to vary the amount of contrast imparted by the filers.

The particular invention herein and above is not limited thereto, and those includes operational arrangements intended to be included, for example, the camera system may include a battery-related power supply so as to not rely on external power sourcing, and this power supply may be rechargeable and optionally may be linked with a solar-charging arrangement (not shown).

A further alternative aspect of the present invention is that the camera may be operable via a cellular network and contain the required cellular network connectivity elements such as antenna, power boosters, signal encoders etc.

The particular invention is not limited to the embodiment illustrated in the images herein, and may include any structures or shapes effective to accomplish the claims noted below without departing from the scope and spirit of the present invention. In a non-limiting example, the felt pad 10 is intended to be a surface friendly and non-damaging laminar member transmissive to magic fields and could be of any material effective for that purpose, such as a smooth plastic sheet or film, a thin cellulose member (paper based or otherwise), thin ferromagnetic sheet or magnetic-transmissive sheet material etc. This pad may be combined (optionally, see FIG. 10C) with a light filter in the same combined 'pad' member and may be of any non-limited shape and need not match the external shape of the camera mount 34.

Additionally, it will be recognized by those of skill in this art having studied the entire disclosure herein that the inner ring (shown frustoconical) may be provided in other shapes effective to accomplish the claims noted without departing from the scope and spirit of the present invention. In a non-limiting example, the 'round' ring 32 may have any other shape (oval, polygon, irregular) effective to maintain or generate a positive buoyancy, pass-through reflected light (from the imaging region (tank) to the camera), and aid in the alternative 'cleaning' feature using the backer 10. It will be similarly understood by those of skill in this art that backer 10 may be of any material effective to aid in minimizing damage to the glass, to be magnetic-transmissive, to aid in cleaning the viewing surface while being guided by hand manipulation of the extra-tank-positioned camera member.

In yet another alternative and optional embodiment, it will be understood by those of skill in this art having studied the disclosure herein that the use of magnetic attraction (to secure the inner member and outer retained camera through an optical member or support stand member) may accommodate improvement in the magnetic materials arts. Such that, magnetic members of enhanced strength may be on only-one-side of the assembly and the other-side assembly may be ferromagnetic (attracted to magnetics) such as by the use of iron/Fe containing materials. As a further example, the front retaining ring may include a magnet or magnetic material formed as a ring with a complementary magnet or magnetic material in the retained camera assembly. As a result, it will be recognized that the present invention may be readily modified while remaining within the scope and spirit of the present disclosure.

In another alternative embodiment it will be recognized that the housings 32, 34, and stand 36 may be provided in any shape effective to accomplish the intended uses herein without departing from the scope and spirit of the present embodiment. For a non-limiting example, the side-wing-shapes (holding magnet members) may be fully internalized or formed in another shape. For example, the 'wings' may be eliminated and all magnetic members be retained within backer 32, or extensions may be in a surrounding ridge (a continuous lip), or may be in alternating extensions (multiple more-than-two) and having different shapes, polygons, different-profiles etc. As such, those of skill in this art will recognize that nothing herein is intended to limit the shape of the illustrative embodiment shown so that those of skill in this art will recognize that different shapes may be within the scope and spirit of the present invention without being narrowed to the shapes shown in the drawings.

The inventors intend that only those claims which use the specific and exact phrase "means for" are intended to be interpreted under 35 USC 112. The structure herein is noted and well supported in the entire disclosure. Moreover, no limitations from the specification are intended to be read into any claims, unless those limitations are expressly included in the claims. It is noted herein that PCB is recognized generally as printed circuit board or other support for solid state electronics as operative for the purposes herein.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure covers modifications and variations of this disclosure provided they come within the scope of the appended claims and their equivalents.

What is claimed as invention is:

1. A cross-partition camera system, comprising:
a magnetic camera;
a magnetic backer ring operative to couple with the magnetic camera to remain movably suspended across a partition;
wherein the magnetic camera and the magnetic backer ring define magnet holder ears housing magnets laterally offset from a frustoconical ring of the backer ring; and
wherein the magnetic backer ring is buoyant in water when uncoupled from the magnetic camera; and
a scrubber pad positioned on a partition-facing side of the magnetic backer ring.

2. The cross-partition camera system of claim 1, wherein:
the magnetic camera further comprises a USB port and a removable SD memory card.

3. The cross-partition camera system of claim 1, wherein:
the scrubber pad is operative for cleaning a portion of a side of the partition as the magnetic camera is manually moved around on the partition while remaining magnetically coupled to the partition.

4. The cross-partition camera system of claim 1, further comprising:
a felt pad on a partition-facing side of the magnetic camera.

5. The cross-partition camera system of claim 4, wherein:
the felt pad is operative for facilitating smooth movement of the magnetic camera as the magnetic camera is manually moved around on the partition while remaining magnetically coupled to the partition.

6. The cross-partition camera system of claim 1, further comprising:
an optical filter positioned across a lens of the magnetic camera.

7. The cross-partition camera system of claim 6, wherein:
the optical filter is orange colored to filter out blue light.

8. The cross-partition camera system of claim 6, wherein:
the optical filter is removable.

9. The cross-partition camera system of claim 1, further comprising:
a plurality of selectable removable optical filters shaped for positioning across a lens of the magnetic camera.

10. The cross-partition camera system of claim 1, wherein:
the partition further comprises:
a removable stand and the cross-partition camera system is configured for magnetic coupling across a glass pane after removal from the stand.

11. The cross-partition camera system of claim 1, wherein:
the partition comprises a glass pane.

12. A cross-partition camera system, comprising:
a magnetic camera;
a magnetic backer ring operative to couple with the magnetic camera to remain movably suspended across a partition;
wherein the magnetic camera and the magnetic backer ring define magnet holder ears housing magnets laterally offset from a frustoconical ring of the backer ring;
wherein the magnetic backer ring is buoyant in water when uncoupled from the magnetic camera; and
a plurality of selectable removable optical filters comprising a plurality of orange colored filter of different color depth to filter different amounts of blue light.

13. The cross-partition camera system of claim 1, further comprising:
a light source for projecting light away from the magnetic camera toward a focal region of the magnetic camera.

14. A cross-partition camera system, comprising:
a magnetic camera;
a magnetic backer ring operative to couple with the magnetic camera to remain movably suspended across a partition;
wherein the magnetic camera and the magnetic backer ring define magnet holder ears housing magnets laterally offset from a frustoconical ring of the backer ring;
wherein the magnetic backer ring is buoyant in water when uncoupled from the magnetic camera;
further comprising:
a pad on a partition-facing side of the magnetic backer ring operative for cleaning the partition opposite the partition-facing side of the magnetic backer ring as the cross-partition camera system is manually moved around on the partition while remaining magnetically coupled to the partition; and
further comprising:
a pad on a partition-facing side of the magnetic camera operative for facilitating facilitate smooth movement of the device on the cross-partition camera as the cross-partition camera system is manually moved around on the partition while remaining magnetically coupled to the partition.

15. The cross-partition camera system of claim 14, further comprising:
a plurality of selectable removable optical filters shaped for positioning across a lens of the magnetic camera.

16. A cross-partition camera system, comprising:
a magnetic camera,
a magnetic backer ring operative to couple with the magnetic camera to remain movably suspended across a partition;
wherein the magnetic camera and the magnetic backer ring define magnet holder ears housing magnets laterally offset from a frustoconical ring of the backer ring;
wherein the magnetic backer ring is buoyant in water when uncoupled from the magnetic camera; and
the partition comprises a removable stand.

17. A cross-partition camera system, comprising:
a magnetic camera;
a magnetic backer ring operative to couple with the magnetic camera to remain movably suspended across a partition;
wherein the magnetic camera and the magnetic backer ring define magnet holder ears housing magnets laterally offset from a frustoconical ring of the backer ring;
wherein the magnetic backer ring is buoyant in water when uncoupled from the magnetic camera;
further comprising:
an optical filter positioned across a lens of the magnetic camera; and
wherein the optical filter is one of a plurality of selectable optical filters of different color depth to filter out different amounts of blue light.

18. The cross-partition camera system of claim 17, wherein:
the optical filter is orange colored to filter out blue light.

* * * * *